(No Model.)
H. H. HESKETT.
FISHING REEL.
No. 496,654. Patented May 2, 1893.
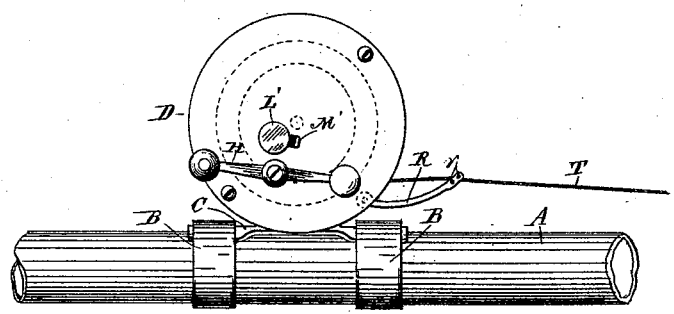
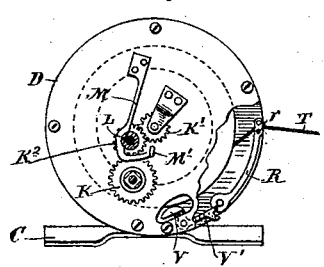
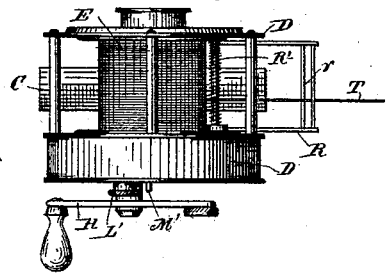
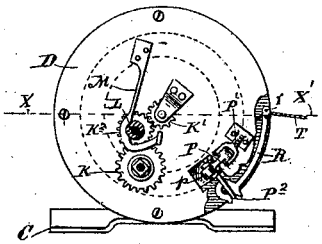
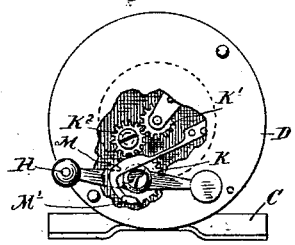
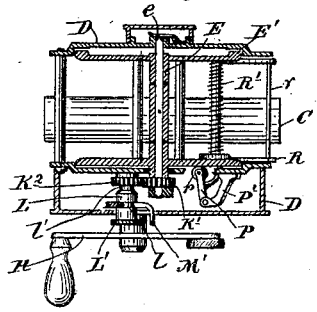
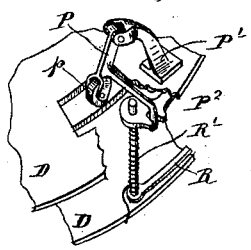
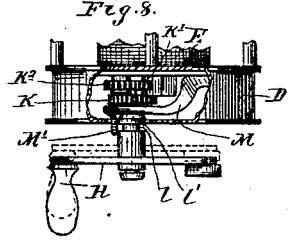
Witnesses.
A. H. Opsahl.
E. F. Elmore.
Inventor.
Harrison H. Heskett
By his Attorney.
Jas. F. Williamson

UNITED STATES PATENT OFFICE.

HARRISON H. HESKETT, OF MINNEAPOLIS, MINNESOTA.

FISHING-REEL.

SPECIFICATION forming part of Letters Patent No. 496,654, dated May 2, 1893.

Application filed February 27, 1892. Serial No. 422,968. (No model.)

*To all whom it may concern:*

Be it known that I, HARRISON H. HESKETT, a citizen of the United States, residing at Minneapolis, in the county of Hennepin and State of Minnesota, have invented certain new and useful Improvements in Fishing-Reels; and I do hereby declare the following to be a full, clear, and exact description of the invention, such as will enable others skilled in the art to which it appertains to make and use the same.

My invention relates to fishing-reels; and has for its principal object to provide an efficient device which will prevent the snarling of the line when being unwound from the spool.

The invention is in the nature of an automatic brake, which when the line is slack, is normally held in position to engage with the spool, and to be set by the unwinding of the same, and when the line is under tension, as in casting, is held out of action against spring tension, which instantly throws the brake into its active position, upon the slacking of the line.

In the preferred form of my construction, I employ a pivoted brake shoe, and a pivoted trip, both of which are held normally in their active positions, by a light spring, which should be of a tension only slightly greater than that of the weights of the parts. The pivoted brake shoe is so mounted with reference to the surface of the spool on which it operates, that the forward motion or unwinding of the spool, will, when the brake is in its active position, set the brake under an increasing friction proportional to the momentum of the spool. The trip has its free end in engagement with the line and so positioned that when the line is slack that it will hold the same up out of a straight line with reference to the end of the pole and the periphery of the spool. Hence, when the line is put under tension as in casting, the pivoted trip will be thrown by the same out of its active position, permitting the free movement of the spool and line; and by the slacking of the line, the trip and the brake will resume their normal or active positions, by the tension thereon from their tension spring.

As another feature of the invention, the construction of the reel is such, as to permit the spool to be released from the crank-lever and be again connected thereto, at will. Hence, when about to cast the line, the spool may be set free from the crank and the wind-up gearing, so that it will run light in casting.

The invention is illustrated in the accompanying drawings, wherein, like letters referring to like parts throughout, Figure 1 is a right side elevation of the reel equipped with my invention, shown as in working position on a pole, the line being under tension. Fig. 2 is a plan view of the reel detached. Fig. 3 is a right side elevation with the gear cap removed and some parts being broken away, the brake and brake trip being shown in their normal or active positions. Fig. 4 is a horizontal section on the line X X' of Fig. 3. Fig. 5 is a detail in perspective, some parts being broken away, showing the brake setting mechanism. Fig. 6 is a right side elevation of the reel, showing a modified form of the brake, some parts being broken away. Figs. 7 and 8 are views in side elevation and plan respectively, some parts being broken away, showing a modified form of the construction for throwing the spool in and out of gear with the crank.

A is the pole, B the rings and C D the reel-case or frame, all of which may be of the ordinary well-known construction.

E is the reel-spool, which in my preferred construction, as shown in Figs. 1, 2, 3, 4 and 5 is mounted for a slight endwise movement on its bearings against a light spring $e$, so as to bring friction surfaces $E'$ on one of its end plates in frictional contact with the inner face of the adjacent end-plate of the case.

H is the crank and K K' $K^2$ the train of multiplying gears for imparting motion from the crank to the spool. Of these gears, one member, which may be either the crank-shaft member K or the intermediate member $K^2$ is mounted to slide endwise for throwing the crank out of gear with the spool. The sliding shaft is provided with two annular seats or grooves $l\ l'$, spaced apart from each other with which is adapted to engage a spring finger or detent M for securing the said sliding shaft in either its active or inactive position. The innermost member $l'$ of these two seats is cam-shaped on its outer face so as to disengage the spring by simply moving the shaft inward. The spring finger M has a projection M' which passes out through a slot in the case into position to be readily operated by the thumb or finger when taking hold of the sliding shaft to pull the same outward into its inactive position. In the construction shown in Figs. 1, 2, 3, 4 and 6, the intermediate gear is mounted to slide being carried by a shaft L, which projects outward through the gear-cap and is provided with a finger piece or head L'. In Figs. 6 and 7, the crank shaft itself is mounted to slide so as to shift the primary gear K. In this case, the head of the crank-shaft or the crank-handle itself is used as a handle to shift the crank-shaft. This latter is my preferred construction, as it is simpler and more convenient in practice. Normally, the spring finger M rests in its outer seat $l$ on the sliding shaft. When it is desired to set the spool, free, as for casting, the sliding shaft is pulled outward, allowing the spring finger to fall into the cam faced seat $l'$. To reconnect with the spool, the sliding shaft is simply pushed inward. In this return movement, the spring-finger will be cammed out of the seat $l'$ and will again snap into the groove $l$, to hold the parts in their normal position.

P is the pivoted brake-shoe, which, as shown, in Figs. 1, 2, 3, 4 and 5, is pivoted to a bracket-like arm or other support P', projecting from the right end of the reel case, and carries at its free end an antifriction-roller $p$ in position to bear against the right end of the spool and effect an endwise movement of the same. The brake-shoe P is provided with an arm $P^2$, which is operated to throw the brake into its active or inactive position, by the pivoted trip-lever R. The trip-lever is of bail-like form, and is journaled at its lower end between the end plates of the spool case. A coiled spring R', wound about the pivot shaft of the bail and secured thereto at one end and having its other end secured to the case, serves to hold the said trip bail and the brake shoe under tension in their active or normal positions. The trip bail R is preferably provided at its upper or free end with a pair of cross rods $r$ between which the line T is passed. The brake-shoe P $p$ is of a length greater than the shortest distance between its point of suspension and the end plate of the spool against which it bears; and the support P' for the same is located in advance of the brake, with reference to the unwinding movement of the spool. Hence, when the brake is in its active position and the spool is unwinding, the movement of the spool will set the brake under increasing friction, according to the amount of the momentum, thus forming what I shall hereinafter denominate a momentum brake.

The operation of these parts is obvious. When the line is under tension, as shown in Fig. 1, the trip lever will be thrown down and the brake released from the spool. When the line becomes slack, the trip lever or bail R will be thrown upward into its normal position, causing the brake-shoe to bear against the spool and move the same endwise so that the friction surfaces E' on its left end plate will come in contact with the left end plate of the reel case, under the momentum of the spool. The friction thus applied will instantly stop the spool. The brake will not interfere with the backward or winding up movement of the spool. In the winding up movement of the spool, the brake is free to give, or swing outward on its pivot.

In the modification shown in Fig. 6, the spool is not mounted for endwise movement and the brake shoe V is mounted so as to bear directly against the periphery of the right end plate of the spool. As shown, this brake-shoe V is pivoted between the end plates of the case directly below the trip-lever and is operated from the trip-lever through an arm V', the free end of which engages with a part of the trip-lever. Otherwise, the action of the brake in the modification is the same as that in the preferred construction. The construction in the modification is somewhat simpler than in the preferred form, but is not so desirable for the reason that the brake-shoe will wear on the thin edge of the spool; and for the further reason, that in the preferred construction, I obtain a much greater friction by the surface E' in contact with the end-plate of the reel. I have demonstrated the practical value of this device, by the actual usage of the same.

It will be noted that the so called brake-shoe P $p'$, in my preferred construction, is also a shifting device regarded with reference to its function for effecting the endwise movement of the spool. It does, however, of itself, act to some extent as a brake.

What I claim, and desire to secure by Letters Patent of the United States, is as follows:

1. In a fishing reel, the combination with the spool and line, of a pivoted brake shoe and a pivoted trip lever for controlling said shoe, the free end of said lever standing normally out of a straight line with reference to the periphery of the spool and the end of the pole and being engaged by the line and a spring for holding the trip-lever in its normal position and the shoe in contact with the spool, whereby tension on the line will throw the lever outward and release the shoe from the spool and the slack of the line will permit the shoe to become active, substantially as and for the purpose set forth.

2. In a fishing reel, the combination with the reel case and line, of a spool mounted upon a shaft and shiftable endwise thereon to effect frictional contact between one of its ends and the adjacent end plate of the case, a spring for normally holding the spool away from said plate, a shifting device arranged to shift the spool endwise against the tension of said spring, and a trip controlled by the tension of the line and arranged to release the shifting device from the spool when the line is under tension, substantially as described.

3. In a fishing reel, the combination with the line, of a spool mounted for endwise movement against spring tension to effect frictional contact between one of its end plates and the adjacent end plate of the case, a pivoted shoe working against the face of the opposite end plate of the spool and arranged to shift the spool under the unwinding movement of the same when the line is slack, a pivoted trip lever having its free end engaged by the line for releasing the shoe when the line is under tension, and a spring for holding said lever and shoe in their normal position, substantially as described.

4. In a fishing reel, the combination with the case, of the spool movable endwise in the case, the spring $e$ at one end of the case bearing upon the end of the spool and holding it normally free from the case, the arm P' on the opposite end of the case, the shoe P pivoted to the arm P' and having an anti-friction roller bearing upon the spool and an arm P², the trip lever engaging the arm P², the spring R' on the trip lever and a line engaging the trip lever, all arranged and operating, substantially as described.

5. In a fishing reel, the combination with the spool and the crank, of a train of gear for imparting motion from the crank to the spool, one member of which is mounted on a sliding shaft for engagement with or disengagement from the others and a detent for holding the sliding member wherever set, the said detent and sliding shaft being provided with parts projecting to the outside of the gear case for operating the same and arranged for operating by a single movement, substantially as described.

6. In a fishing reel, the combination with the spool of the crank shaft, the train of gears for operating the spool, one member of which is carried by the inner end of the sliding crank shaft, the annular seats on said shaft for the spring finger or detent, one of which is cam faced, and the spring finger or detent working in said seats and provided with an operating projection extending through a slot in the gear cap and terminating near the head of the crank shaft, substantially as and for the purpose set forth.

In testimony whereof I affix my signature in presence of two witnesses.

HARRISON H. HESKETT.

Witnesses:
JAS. F. WILLIAMSON,
EMMA F. ELMORE.